US012601844B2

(12) United States Patent
Kumar et al.

(10) Patent No.: US 12,601,844 B2
(45) Date of Patent: Apr. 14, 2026

(54) SATELLITE SIGNAL SPOOFING DETECTION SYSTEM

(71) Applicant: Honeywell International Inc., Charlotte, NC (US)

(72) Inventors: Perumal Kumar, Bangalore (IN); Sanjay Lenka, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 375 days.

(21) Appl. No.: 18/186,670

(22) Filed: Mar. 20, 2023

(65) Prior Publication Data

US 2024/0255650 A1 Aug. 1, 2024

(30) Foreign Application Priority Data

Feb. 1, 2023 (IN) .............................. 202311006533

(51) Int. Cl.
| | |
|---|---|
| *G01S 19/21* | (2010.01) |
| *G01S 19/36* | (2010.01) |
| *G01S 19/15* | (2010.01) |

(52) U.S. Cl.
CPC ............ *G01S 19/215* (2013.01); *G01S 19/36* (2013.01); *G01S 19/15* (2013.01)

(58) Field of Classification Search
None
See application file for complete search history.

(56) References Cited

U.S. PATENT DOCUMENTS 5,995,042 A * 11/1999 Durboraw, III .......... H04K 3/90
                                                        342/357.58
7,880,667 B2   2/2011 Lanzkron
(Continued)

FOREIGN PATENT DOCUMENTS

EP      2455781 A1    5/2012
EP      3428688 A1    1/2019
(Continued)

OTHER PUBLICATIONS

European Patent Office, "Extended European Search Report", dated Jul. 9, 2024, from EP Application No. 24150795.3, from Foreign Counterpart to U.S. Appl. No. 18/186,670, pp. 1 through 9, Published: EP.

(Continued)

*Primary Examiner* — Vladimir Magloire
*Assistant Examiner* — Ashley Brown Raynal
(74) *Attorney, Agent, or Firm* — Fogg & Powers LLC

(57) ABSTRACT

A satellite spoofing signal detection system with at least one primary antenna installed on a top side of a vehicle body, at least one secondary antenna installed on a bottom side of the vehicle body, and a spoofing controller is provided. The spoofing controller is configured to determine if a spoofing signal is present by comparing primary satellite signals received by the at least one primary antenna and secondary satellite signals received by the at least one secondary antenna. The spoofing controller determines if a spoofing signal is present by comparing a number of satellites used in position computations along with protection limits determined by the primary satellite signals and the secondary satellite signals. Other information from the primary and secondary antennas, such as visible satellites, receiver autonomous integrity monitoring, dilution of precision, and satellite almanac information may be used to determine if a spoofing signal is present.

20 Claims, 7 Drawing Sheets

(56)                     References Cited

U.S. PATENT DOCUMENTS

| | | | |
|---|---|---|---|
| 9,523,774 | B2 | 12/2016 | Davies |
| 10,120,080 | B2 | 11/2018 | Davies |
| 10,830,897 | B2 | 11/2020 | Zangvil et al. |
| 11,237,273 | B2 | 2/2022 | Leibner et al. |
| 2012/0041620 | A1 | 2/2012 | Stayton et al. |
| 2013/0162477 | A1* | 6/2013 | Waters .................... G01S 19/24 |
| | | | 342/372 |
| 2017/0102464 | A1* | 4/2017 | Davies ................. G01S 19/215 |
| 2018/0299560 | A1* | 10/2018 | Zangvil ................... G01S 19/36 |
| 2023/0417927 | A1* | 12/2023 | Sato ................... H04W 12/122 |

FOREIGN PATENT DOCUMENTS

| | | | |
|---|---|---|---|
| EP | 3499269 | A1 | 6/2019 |
| EP | 3555665 | A1 | 10/2019 |
| KR | 101862934 | B1 | 5/2018 |
| KR | 102350194 | B1 | 1/2022 |
| WO | 2020240571 | A1 | 12/2020 |
| WO | 2022162401 | A1 | 8/2022 |

OTHER PUBLICATIONS

European Patent Office, "Communication pursuant to Article 94(3)EPC", dated Apr. 28, 2025, from EP Application No. 24150795.3, from Foreign Counterpart to U.S. Appl. No. 18/186,670, pp. 1 through 8, Published: EP.

* cited by examiner

100

ANTENNA
101-1

ANTENNA
101-n

RECEIVER(S)
106

VEHICLE CONTROL
SYSTEM    110

CONTROLLER
102

MEMORY
108

COMMUNICATION
UNIT    114

SATELLITE SIGNAL SPOOFING DETECTION SYSTEM

CROSS-REFERENCE TO RELATED APPLICATION

This application claims priority to Indian Application No. 202311006533 filed on Feb. 1, 2023, same title herewith, the contents of which are incorporated herein in its entirety.

BACKGROUND

A recent threat to the accuracy of information from Global Navigation Satellite System (GNSS) receivers comes from spoofing. Spoofing occurs when signals, not originating from satellites, are inadvertently processed by the GNSS receiver as satellite signals. This may lead the GNSS receiver to output erroneous position outputs decoded from the received signals.

In an aircraft application, GNSS receiver outputs may be consumed by multiple aircraft critical systems including automatic dependent surveillance-broadcast (ADS-B), enhanced ground proximity warning system (EGPWS), terrain avoidance and warning system (TAWS), Flight Controls etc. Further, required navigation performance (RNP) may be deteriorated due to spoofing.

Incorrect information from the GNSS receivers caused by spoofing can result in an aircraft being off tracked from a desired travel path. This may result in a catastrophic event. Aircraft are especially vulnerable to a catastrophic event when spoofing occurs during an aided landing operation that uses positioning data from a GNSS receiver. Examples of aided landing systems that may use satellite signals to aid in landing include ground-based augmentation system (GBAS) landing system (GLS), satellite-based augmentation system (SBAS), and localizer performance with vertical guidance (LPV) systems.

Spoofing signals, either generated by a bad actor or other unintentional source, are typically transmitted from a ground source and are generally more effective when an aircraft is at lower altitude. At lower altitudes, the signal strength from spoofing signals generated from the ground is relatively strong making it more likely to be locked/processed by a GNSS receiver as if the spoofing signals are from GNSS satellites.

Further, spoofing signals broadcast from the ground can impact multiple aircrafts traveling in a coverage area of the spoofing signals. This can lead to plurality aircraft receiving incorrect position information which increases the probability of aircraft-to-aircraft collisions.

Spoofing is not only an issue for traditional aircraft but also unmanned aerial vehicles (UAVs)/urban air mobility (UAM) as well as other air/sea/land vehicles.

For the reasons stated above and for other reasons stated below which will become apparent to those skilled in the art upon reading and understanding the present specification, there is a need in the art for an effective and efficient spoofing threat detection system to ensure received satellite signals are accurate and reliable.

SUMMARY

The following summary is made by way of example and not by way of limitation. It is merely provided to aid the reader in understanding some of the aspects of the subject matter described. Embodiments provide a satellite signal spoofing detection system that effectively and efficiently determines if a spoofing signal is present with the use of a primary antenna and at least one secondary antenna. Primary information determined from the primary antenna is compared with secondary information determined from the at least one secondary antenna is compared in determining if spoofing signals are present.

In one embodiment, a satellite spoofing signal detection system is provided. The system includes at least one primary antenna installed on a top side of a vehicle body, at least one secondary antenna installed on a bottom side of the vehicle body, and a spoofing controller. The spoofing controller is configured to determine if a spoofing signal is present by comparing primary satellite signals received by the at least one primary antenna and secondary satellite signals received by the at least one secondary antenna. The spoofing controller determines if a spoofing signal is present by comparing at least one of a number of satellites used in position computations along with protection limits and a number of visible satellites determined by the primary satellite signals and the secondary satellite signals.

In another embodiment, a method of detecting a spoofing signal is provided. The method includes receiving primary satellite signals from a primary antenna and secondary satellite signals from at least one secondary antenna, wherein the primary antenna is mounted on a top side of a vehicle than the at least one secondary antenna is mounted on a bottom side of the vehicle; and comparing primary information from the primary satellite signals and secondary information from the secondary satellite signals in determining if a spoofing signal is present in one of the primary satellite signals and the secondary satellite signals, wherein the primary information and the secondary information includes a number of satellites used in position computations along with protection limits.

In yet another embodiment, another method of detecting a spoofing signal is provided. The method includes receiving primary satellite signals from a primary antenna and secondary satellite signals from at least one secondary antenna, wherein the primary antenna is mounted on a top side of a vehicle and the at least one secondary antenna is mounted on a bottom side of the vehicle; and comparing primary information from the primary satellite signals and secondary information from the secondary satellite signals in determining if a spoofing signal is present in one of the primary satellite signals and the secondary satellite signals, wherein the primary information and the secondary information includes a number of visible satellites.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a satellite signal spoofing detection system. In examples, two spaced satellite signal antennas are used. Information obtained from signals received at the antennas are processed and compared to determine if a spoofing signal is present. In one example, at least one primary global positioning satellite (GPS) antenna is installed on top (upper portion) of an aircraft body and at least one secondary GPS antenna is installed on a belly (lower portion) of the aircraft body. A spoofing controller is configured to determine if a spoofing signal is present by comparing primary information derived from satellite signals received by the primary GPS antenna (primary antenna) and secondary information derived from satellite signals received by the at least one secondary GPS antenna (secondary antenna). In one example, the spoofing controller determines if a spoofing signal is present by comparing primary and secondary information relating to a number of satellites used in position computations along with protection limits determined by the primary satellite signals and the secondary satellite signals.

Figure 1:
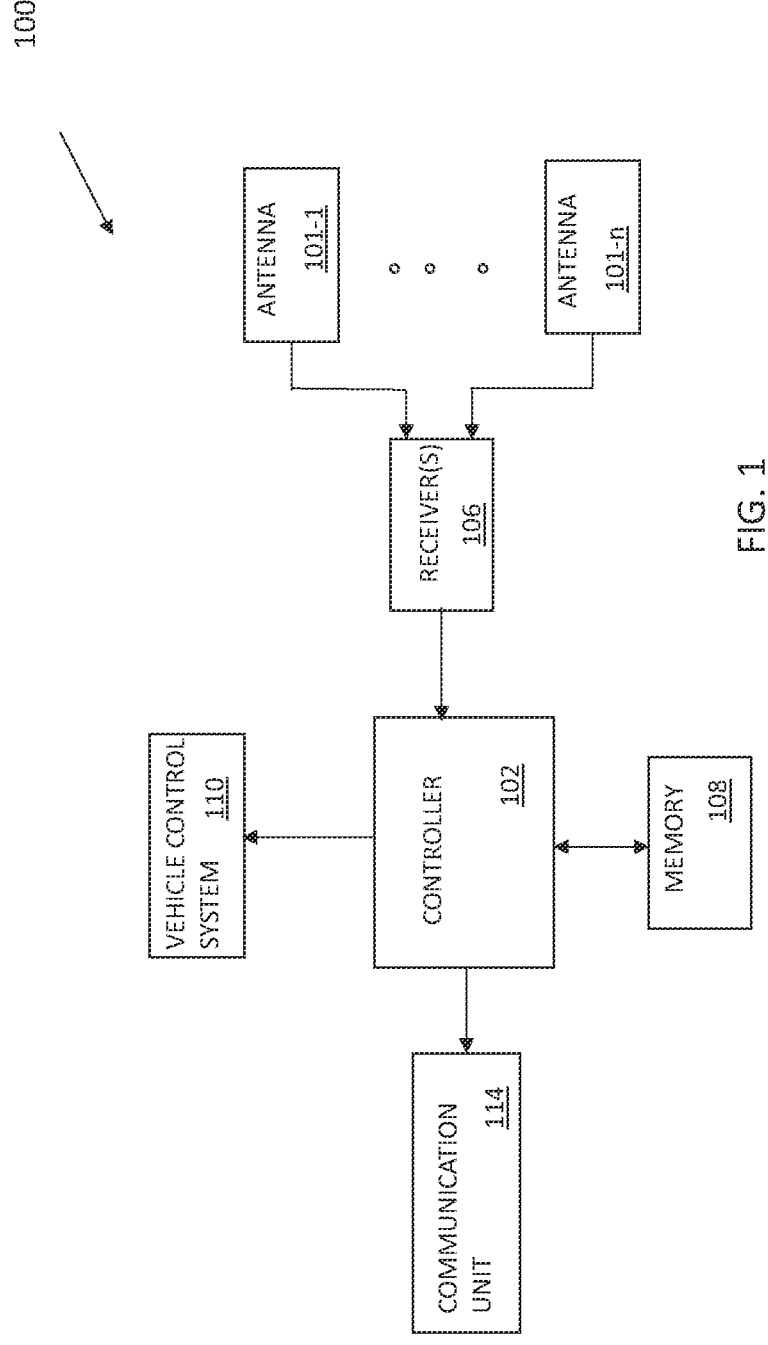
FIG. 1 illustrates a block diagram of a satellite signal spoofing detection system according to an example aspect of the preset invention.

A block diagram of a satellite signal spoofing detection system 100 of an example is illustrated in FIG. 1. This example includes a spoofing controller 102 that is in communication with one or more receivers 106. The one or more receivers 106 are in communication with antennas 101-1 through 101-n. The antennas may be generally referenced by 101. In one example there is an antenna 101 for each receiver 106. In another example one receiver 106 is in communication with a plurality of antennas 101.

The spoofing controller 102 is further in communication with a memory 108. The memory 108 includes operating instructions implemented by the spoofing controller 102 as well as past signal information received from the plurality of antennas 101. The spoofing controller 102, based on received primary and secondary information determines if a spoofing signal has been detected. In one example spoofing controller 102 then provides control signals to a vehicle control system 110 used to control operations of a vehicle incorporating the satellite signal spoofing detection system 100.

In general, the spoofing controller 102 may include any one or more of a processor, microprocessor, a digital signal processor (DSP), an application specific integrated circuit (ASIC), a field program gate array (FPGA), or equivalent discrete or integrated logic circuitry. In some example embodiments, the spoofing controller may include multiple components, such as any combination of one or more microprocessors, one or more controllers, one or more DSPs, one or more ASICs, one or more FPGAs, as well as other discrete or integrated logic circuitry. The functions attributed to the spoofing controller 102 herein may be embodied as software, firmware, hardware or any combination thereof. The spoofing controller 102 may be part of a system controller or a component controller. Further the spoofing controller 102 may be part of a receiver 106. The memory 108 may include computer-readable operating instructions that, when executed by the spoofing controller provides functions of the satellite signal spoofing detection system 100. Such functions may include the functions of determining if a spoofing signal is present described below. The computer readable instructions may be encoded within the memory 108. Memory 108 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically erasable programmable ROM (EEPROM), flash memory, or any other storage medium.

The satellite signal spoofing detection system 100 may further include a communication unit 114 that is designed to communicate information relating to the detection of a spoofing signal to a remote location so the information may be used by other vehicles. For example, whenever a spoofing signal is detected, an alert, such as a spoofing alert, may be generated by the spoofing controller 102 and broadcasted by the communication unit 114 to a spoofing database which may be in a centralized location, such as a cloud, so that vehicles with access to the resource database that are in a close geographical location to where the spoofing signal was detected can take appropriate measures to mitigate the spoofing signals. In one example, spoofing detection may be broadcast by the communication unit 114 in real time. In another example, a spoofing detection may be store in the memory 108 and broadcast at a later time. The memory 108 may include its own spoofing database that includes determined spoofing signal information that may be used to broadcast spoofing information at a later time as well as for vehicle operations.

Figure 2:
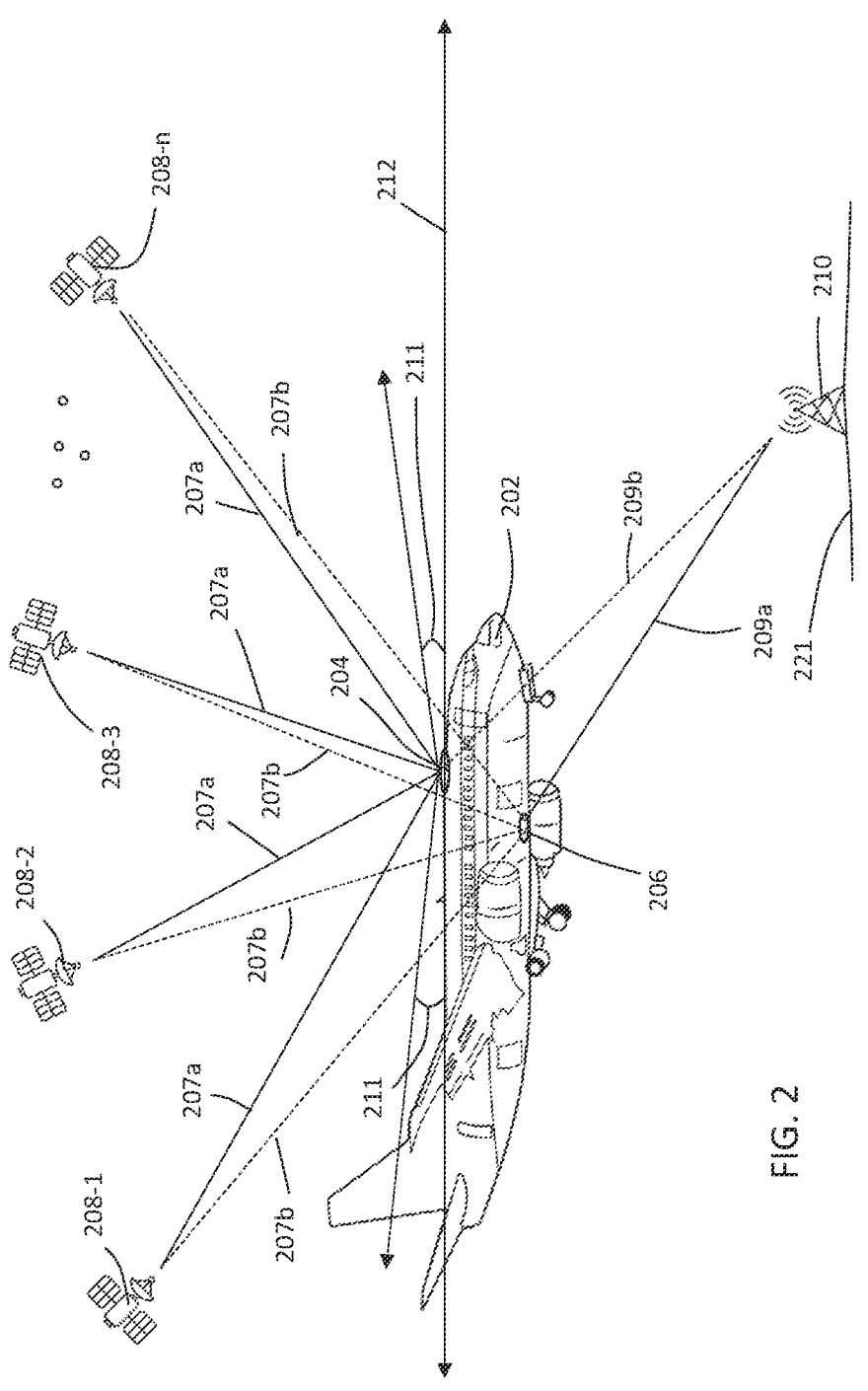
FIG. 2 illustrates an aircraft with a satellite signal spoofing detection system according to an example aspect of the preset invention.

An example of a vehicle implementing a satellite signal spoofing detection system 100 is an aircraft, such as aircraft 202 of FIG. 2. In the aircraft 202 example receivers 106, such as GNSS receivers, are fed with GNSS signals, or satellite signals, received from active antennas 204 and 206. Typically, at least one antenna 204 (the primary antenna) is installed at upper body portion of the aircraft 202 to ensure satellites visibility. As illustrated in FIG. 2, the visible satellites include satellites 208-1 through 208-n. Further the upper antennas 204 are normally installed on the upper portion of the aircraft so that GPS satellites visibility is ensured above 15 degrees 211 above horizon 212.

In this embodiment, additional antenna 206 (secondary antenna), or secondary antennas, are installed on a lower portion of the body, or belly, of the aircraft 202. A ground plate, where antenna 206 is mounted on the belly of the aircraft, facilitates very low signal reception or no reception (where sky visibility is absent) for the signals coming from the satellites 208-1 through 208-n. Accordingly, antenna 204 on the top portion of aircraft has better visibility and reception of the satellite signals from the satellites 208-1 and 208-n. This arrangement may lead to around 30 dB or better signal attenuation at the bottom belly of aircraft 202 compared to antenna installed on top of the aircraft 202 relating to satellite signals generated by satellites 208-1 through 208-n. This is illustrated in FIG. 2, where satellite signals 207a from satellites 208-1 through 208-n received at the upper antenna 204 are shown as solid lines (stronger signals) while satellite signals 207b received at the lower antenna 206 are shown with dashed lines (weaker signals).

FIG. 2 further illustrates spoofing signals 209a and 209b generated from a transmitter 210 that is located on the ground 221. As illustrated, signals 209a received at the lower antenna 206 may be stronger than signals 209a received at the upper antenna 204, provided the aircraft 202 is generally flying in a straight path when spoofing signals are detected.

Signals received by antennas 204 and 206 from the top and belly of the aircraft 202 may be fed to a dual GPS engine/receiver for position solution and monitoring, such as receiver(s) 106 and spoofing controller 102 discussed above. The configuration of the plurality of spaced antennas allows for monitoring of at least primary and secondary information derived from signals received at the antennas which may be used for determining spoofing. For example, the primary and secondary information may include signal strength information and other information. Satellite signals 207a received at the primary antenna 204 mounted on the upper body of aircraft 202 should have signal strength at least 20 to 30 dB stronger than the similar satellite signals 207b received by the secondary antenna 206 placed at belly of aircraft 202 in normal operations. If the strength of the signals at the primary antenna 204 is not stronger than the strength of the signals received at the secondary antenna, a spoofing signal may be present. Hence, the primary and secondary information may relate to received signal strength.

In another example, the primary and secondary information may include the number of visible satellites 208-1 through 208-n. A satellite is visible if its signals are received by an antenna. The number of visible satellites should be higher for the upper antenna 204 compared to lower antenna 206 under normal conditions. The primary and secondary information relating to the number of visible satellites may also be used to determine if a possible spoofing signal is present. For example, if the information relating to the visible satellites indicates more satellites are visible at the secondary antenna than the primary antenna (or more than should be visible compared to the primary antenna) a spoofing signal may be present.

Other types of primary and secondary information may also be used in detecting if a spoofing signal is present as discussed further below. The spoofing controller 102 may generate a spoofing detection alert signal that may be used, for example, by the vehicle control system 110 to control operations of the vehicle and/or it may be communicated to a remote location through the communication unit 114 so other vehicles can be warned of the spoofing signal.

Figure 3:
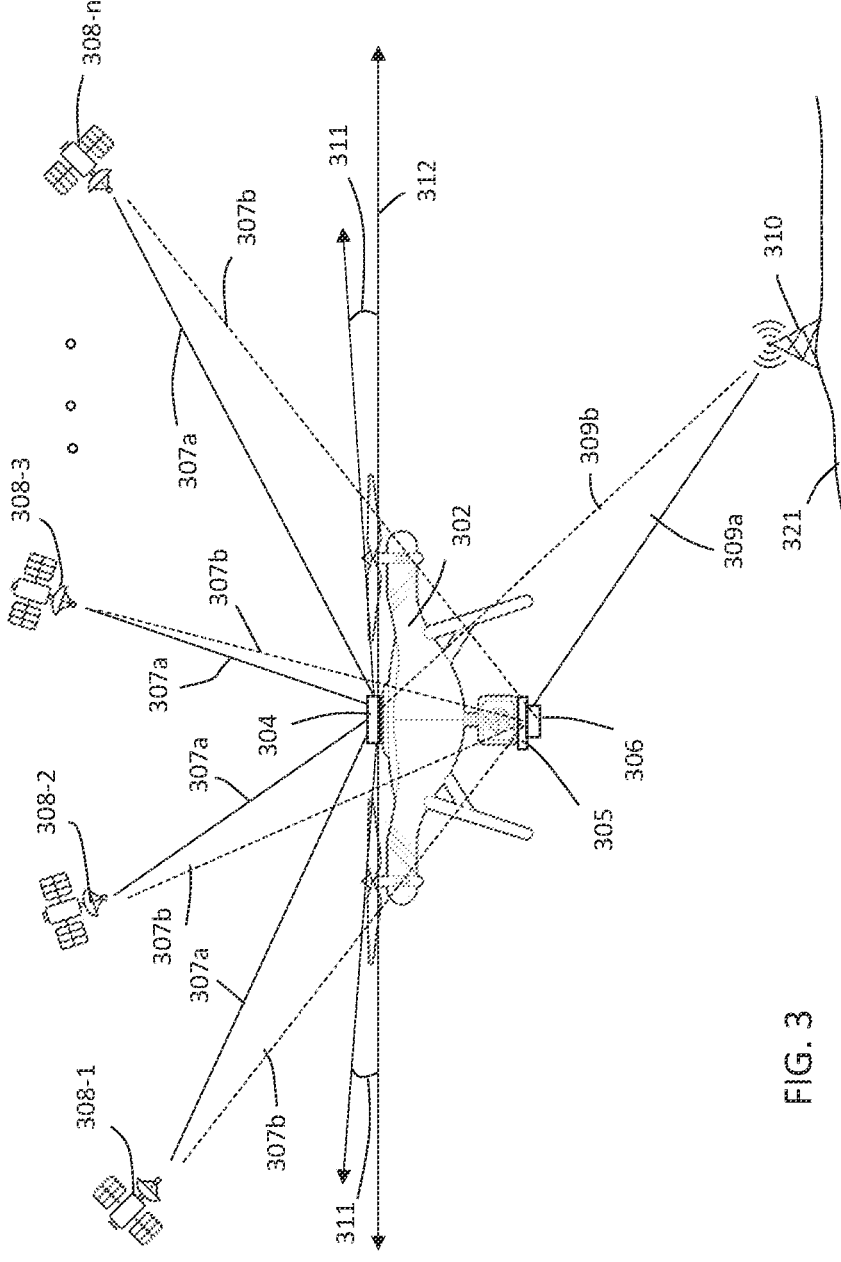
FIG. 3 illustrates a UAV with the satellite signal spoofing detection system according to an example aspect of the preset invention.

Another example of an avionic vehicle is a UAV 302 implementing a satellite signal spoofing detection and correction system 100 is illustrated in FIG. 3. In the UAV example, receivers 106, are fed with satellite signals received from antennas 304 and 306. Here again, at least one antenna 304 (primary antenna) is installed at upper body of the UAV 302 to ensure satellites visibility. As illustrated in FIG. 3, the visible satellites include satellites 308-1 through 308-n. Antenna 304 is normally installed on the upper side of a UAV 302 so that the GPS satellites visibility is ensured usually 15 degree 311 above horizon 312.

In this embodiment, additional antenna 306 (secondary antenna), or antennas, are installed on the bottom portion or belly of the UAV 302. In this example, a ground plate 305 (or mounting plate) may also be used to couple the antenna 306 to the UAV 302. The ground plate 305 may be used to facilitate a very low signal reception (reduce satellite signal strength) or no reception (where sky visibility is absent) for the signals coming from the satellites 308-1 through 308-n by reducing the strength or totally stopping satellites signals incident on the ground plates 305. The result allows antenna 304 on the top of UAV 302 have better visibility and reception of the satellite signals from the satellites 308-1 and 308-n than antenna 306 mounted on the bottom portion of the UAV. In one example the ground plate 305 is made from aluminum. This configuration may lead to around 30 dB or better signal attenuation from the satellite signals at antenna 306 compared to the satellite signal strength at antenna 304.

Satellite signal strength at the antennas 304 and 306 are illustrated in FIG. 3, where primary satellite signals 307a from satellites 308-1 through 308-n received at the upper antenna 304 are shown as solid lines (stronger signals) while secondary satellite signals 307b received at the lower antenna 306 are shown with dashed lines (weaker signal).

FIG. 3 further illustrates spoofing signals 309a and 309b generated from a transmitter 310 that is located on the ground 321. As illustrated, signals 309a received at the lower antenna 306 may be stronger than signals 309a received at the upper antenna 304, provided the UAV 302 is in a horizontal flying position when spoofing signals are detected.

Satellite signals received by antennas 304 and 306 may be feed to dual GPS engines/receivers for position solution and monitoring, such as receiver(s) 106 and spoofing controller 102 discussed above. In one example, the spoofing controller 102 is located in the receiver 106 and compares primary and secondary information to detect any anomaly that could indicate spoofing signals are present as discussed below.

In an application of the satellite signal spoofing detection system 100 with dual antennas in aerial vehicles, the aerial vehicles orientation in relation to the ground 321 may need to be taken into consideration. For example, a high bank angle of the vehicle may influence the number of satellites seen by the antennas 304 and 306. In particular, a high bank angle may reduce the number of satellites seen (and may reduce satellite signal strength) at the primary antenna 304 and increase the number of satellites seen (and may increase satellite signal strength) at the secondary antenna 306. This may be more applicable to UAV than commercial aircraft that transports people where high bank angles are unlikely to be used.

Figure 4A:
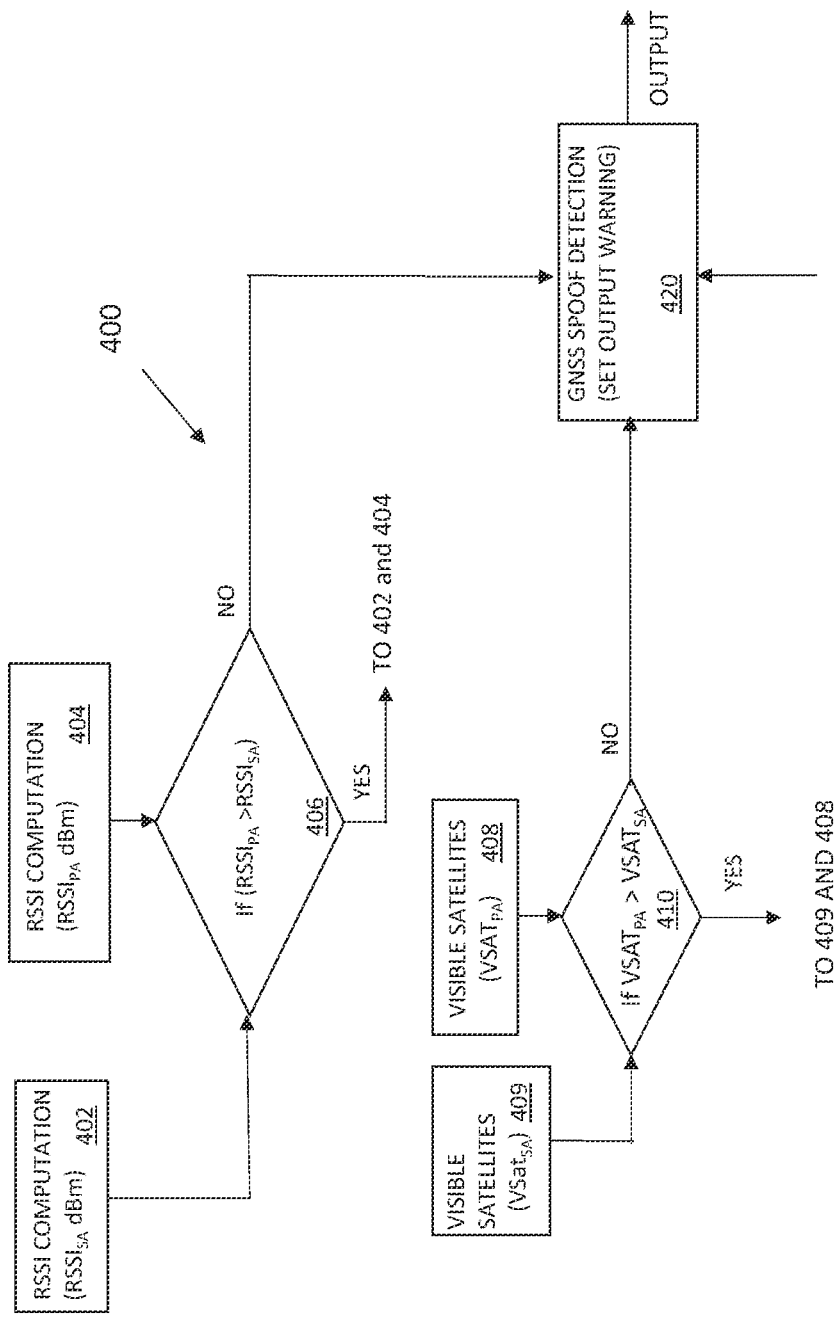
FIG. 4A illustrates a first portion of a satellite signal spoofing detection flow diagram according to an example aspect of the preset invention.
Figure 4B:
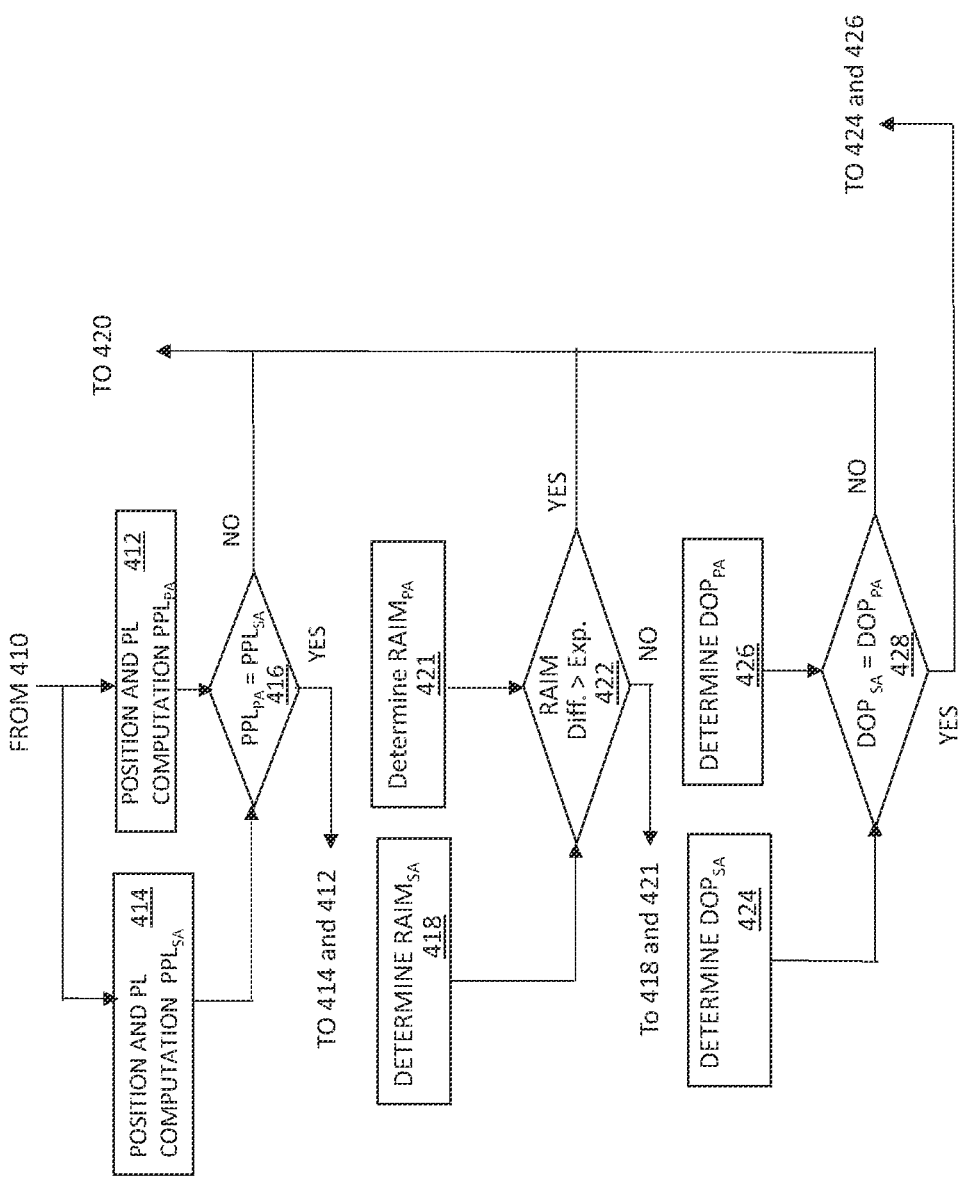
FIG. 4B illustrates a second portion of the satellite signal spoofing detection flow diagram of FIG. 4A.
Figure 4C:
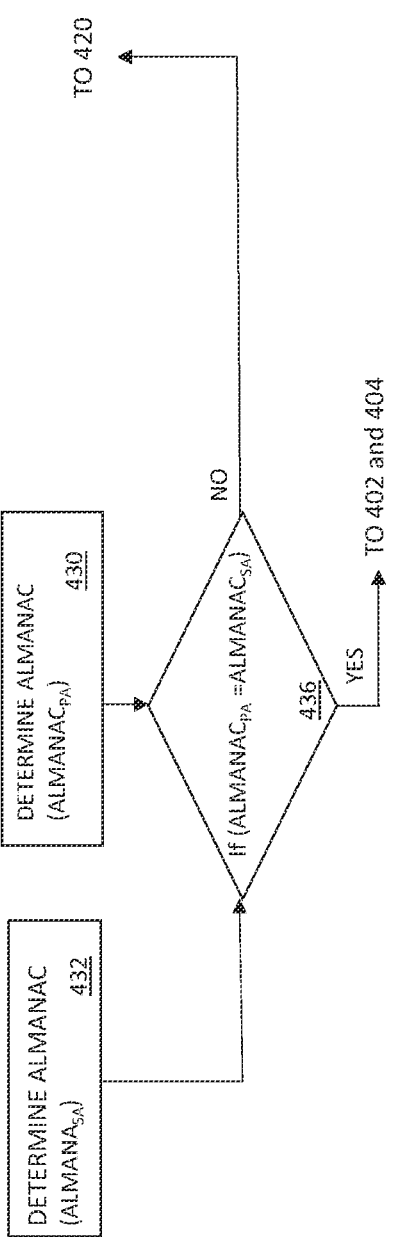
FIG. 4C illustrates a third portion of the satellite signal spoofing detection flow diagram of FIG. 4A.

FIGS. 4A, 4B, and 4C illustrates an example satellite signal spoofing detection and correction flow diagram 400 implemented by the spoofing controller 102. Flow diagram 400 is provided as a series of sequential blocks. The sequence of blocks may occur in a different order or in parallel in other examples. Hence, embodiments are not limited to the sequence set out in flow diagram 400. Further the satellite signal spoofing detection and correction flow diagram 400 provides different types of primary information obtained from the primary satellite signals and secondary information obtained from the secondary satellite signals in determining if a spoofing signal is present. Not all of the types of information discussed, or combinations of information discussed, needs to be used in determining if a spoofing signal is present in examples.

Referring to FIG. 4A, satellite signals received or detected at a primary antenna and a secondary antenna (such as primary antenna 304 and secondary antenna 306 of FIG. 3) is processed. At block 402 a received signal strength indicator (RSSI) for each received signal at the secondary antenna 306 is determined and at block 404 the RSSI for each received signal at the primary antenna 304 is determined. At block 406, a determining function is used to determine if RSSI of the received signals from the primary antenna 304 is greater than the RSSI of the received satellite signals from the secondary antenna 306. If it is determined at block 406 that the RSSI of the received signals from the primary antenna 304 is not greater than the RSSI of the received satellite signals from the secondary antenna 306, a determining function output signal relating to the RSSI information is sent to a GNSS spoof detection block 420. If it is determined at block 406 that the RSSI of the received signals from the primary antenna 304 is greater than the RSSI of the received satellite signals from the secondary antenna 306, the process continues monitoring the RSSI at blocks 402 and 404.

The GNSS spoof detection block 420 gathers output signals from different determining functions, such as described in block 406, as well as blocks 410, 412, 422 and 428 described below, in determining if a spoofing detection alert signal should be generated that would be used, for example, by the vehicle control system 110 or would be communicated to a remote location through the communication unit 114. Determining when a spoofing detection alert signal should be generated may vary. For example, one output signal from one determining function that indicates a spoofing signal may be present may be enough to generate a spoofing detection alert signal and, in another example, signals from more than one determining function may be required before a spoofing detection alert signal is generated. In one example, determining functions may be weighted where heaver weighting determining functions may require less (if any) other determining function output signals in determining to generate a spoofing detection alert signal. Further output signals from determining functions with lower weighting determining functions may require further outputs from one or more determining function to verify a spoofing detection alert signal should be generated. An example of a GNSS spoof detection block 402 that uses a weighted system is described below in regard to FIG. 5.

The number of visible satellites by the primary antenna 304 is determined at block 408 and the number of visible satellites by the secondary antenna 306 is determined at block 409. In an example, this is done by counting the satellite signals from different satellites received at the respective antennas 304 and 306. At block 410 it is determined if the number of visible satellites at the primary antenna 304 is greater than the number of visible satellites at the secondary antenna 306. If the number of visible satellites at the primary antenna 304 is not greater than the number of visible satellites at the secondary antenna 306, a determining function output signal relating to the visible satellite information is provided to block 420 where it is determined if a spoofing detection alert signal should be generated. As discussed above, in at least one example more than one type of information from more than one determining function output signal may be used before a spoofing detection alert signal is generated at block 420. If it is determined that the number of visible satellites at the primary antenna 304 is greater than the number of visible satellites at the secondary antenna 306 at block 410, the process continues monitoring for the number of visible satellites at blocks 408 and 409.

At block 412, a position and associated protection limit computation with the satellite signals from the primary antenna 304 is determined and at block 414 and a position and protection limit computation with the satellite signals from the secondary antenna 306 is determined as illustrated in FIG. 4B. A receiver protection limit is a protection level that describes a region that is assured to contain the receiver's position. The protection limit is a maximum likely position error to a specified degree of confidence. If, for example, a GNSS receiver determines its position with a 95 percent protection level of one meter, there is only a 5 percent chance that reported position is more than one meter away from its true position.

At block 416 it is determined if the position computation and protection limit from the satellite signals from the primary antenna 304 is equal to the position computation and protection limit from the satellite signals from the secondary antenna 306. If the position computation and protection limit from the satellite signals from the primary antenna 304 is not equal to the position computation and protection limit from the satellite signals from the secondary antenna 306, a determining function output signal relating to the position and protection limit information is sent to block 420. If the position computation and protection limit from the satellite signals from the primary antenna 304 is equal to the position computation and protection limit from the satellite signals from the secondary antenna 306, the process continues monitoring the position and protection limits at blocks 412 and 414.

Further in an example, the primary and secondary information may include an indication from a receiver autonomous integrity monitoring (RAIM) function or system. A RAIM system detects faults with the use of redundant pseudorange measurements when more satellites are available then needed. In the system, redundant pseudorange measurements based on signals from different satellites are compared with each other. If pseudorange measurements differ significantly from an expected value, it may indicate that a spoofing signal is present.

At block 418 $RAIM_{SA}$ information is determined for signals received at the secondary antenna 306 and at block 421 $RAIM_{PA}$ information is determined for signals received at the primary antenna 304. At block 422 it is determined if either of the $RAIM_{SA}$ or $RAIM_{PA}$ information indicates a spoofing signal may be present. If it is determined that a difference between redundant pseudorange measurements, at one or more of the antennas 304 and 306, is greater than expected at block 422, a determining function output signal relating to the RAIM information is sent to block 420. If it is determined that a difference between redundant pseudorange measurements, at one or more of the antennas 304 and 306, is not greater than expected, the RAIM information is continued to be monitored at blocks 418 and 421.

Further dilution of precision (DOP) information may also be looked at to determine if a spoofing signal is present. DOP information relates to the monitoring of relative satellite-antenna (receiver) geometry based on received satellite signals from different satellites at an antenna. When receiving satellites signals are from satellites that are spread out a good geometric DOP is observed with a low DOP value. When the receiving satellites signals are from satellites that are close together a weak geometric DOP is observed with a high DOP value. Spoofing signals will affect the DOP value which my lead to a determination that a spoofing signal is present. In one example, the DOP value from signals received at the primary antenna 304 is compared to the DOP value from signals received at the secondary antenna 306.

At block 424, $DOP_{SA}$ information is determined for signals received at the secondary antenna 306 and at block 426, $DOP_{PA}$ information is determined for signals received at the primary antenna 304. At block 428 it is determined if the $DOP_{SA}$ is equal to the $DOP_{PA}$. If the $DOP_{SA}$ is not equal to the $DOP_{PA}$ a spoofing signal may have been detected and a determining function output signal relating to the DOP information is sent to block 420. The process then continues at blocks 402 and 404 computing RSSI.

As illustrated in FIG. 4C, the primary and secondary information may include satellite almanac information. Satellite almanac information relates to digital schedule of satellite parameters used for such things as providing a necessary correction factor to relate GPS time to coordinated universal time (UTC). Further, one major role of the almanac information is to help a GNSS receiver acquire satellite signals from a cold or warm start by providing data on which satellites will be visible at any given time together with approximate positions. At block 430, $ALMINAC_{PA}$ is determined and at block 432, $ALMINAC_{SA}$ is determined. At block 436 it is determined if the $ALMINAC_{PA}$ information is equal to $ALMINAC_{SA}$ information. If it is determined at block 436 the $ALMINAC_{PA}$ information is equal to $ALMINAC_{SA}$ the process continues monitoring primary and secondary almanac information at blocks 430 and 432. However, it is determined at block 436 the $ALMINAC_{PA}$ information is not equal to $ALMINAC_{SA}$ (or varies above a threshold set) a spoofing signal may have been detected and a determining function output signal relating to the almanac information is sent to block 420.

Figure 5:
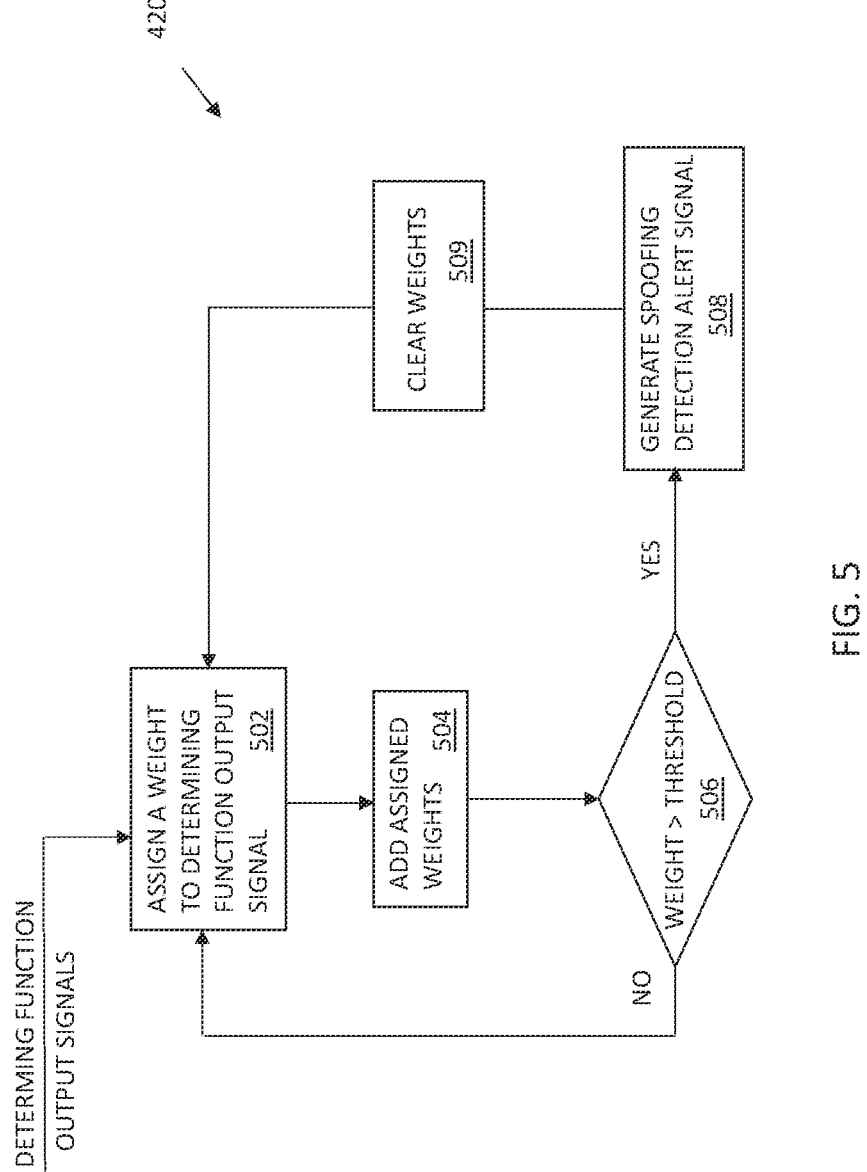
FIG. 5 illustrates a flow diagram example of a spoofing detection alert signal generation method implemented by a GNSS spoof detection block according to an example aspect of the present application.

FIG. 5 illustrates a flow diagram example of a spoofing detection alert signal generation method implemented by block 420. The flow diagram of block 420 is provided as a series of sequential blocks. The sequence of blocks may occur in a different order or in parallel in other examples. Hence, embodiments are not limited to the sequence set out in flow diagram 400.

As discussed above, each determining function output signal generated by blocks 406, 410, 416, 422, 428, and 436 may be assigned their own unique weight based on how likely the determining function output signal indicates a spoofing signal is present. At block 502, each determining function output signal is received and assigned a weight based on how likely the determining function output signal indicates a spoofing signal is present. At block 504 an assigned weight determined at block 502 is added to any previous weights from determining function output signals (if any). At block 506 it is then determined if the weight is above a threshold. If it is determined at block 506 the weight is not above the threshold, the process continues at block 502 assigning a weight to a next determining function output signal received at block 502.

If it is determined at block 506 the weight (combined or not) is above the threshold, a spoofing detection alert signal is generated at block 508. The process then continues at block 509 clearing the weights and then to block 502 looking for the next determining function output signal indicating a spoofing signal is present.

Although, the above examples discuss aeronautical vehicles, other types of vehicles including land and water vehicles using satellite signals may use this technology to detect spoofing signals.

Example Embodiments

Example 1 is a satellite spoofing signal detection system. The system includes at least one primary antenna installed on a top side of a vehicle body, at least one secondary antenna installed on a bottom side of the vehicle body, and a spoofing controller. The spoofing controller is configured to determine if a spoofing signal is present by comparing primary satellite signals received by the at least one primary antenna and secondary satellite signals received by the at least one secondary antenna. The spoofing controller determines if a spoofing signal is present by comparing at least one of a number of satellites used in position computations along with protection limits and a number of visible satellites determined by the primary satellite signals and the secondary satellite signals.

Example 2 includes the system of Example 1, wherein the spoofing controller further determines if a spoofing signal is present by comparing a signal strength between the primary satellite signals and the secondary satellite signals.

Example 3 includes the system of any of the Examples 1-2, wherein the top side of the vehicle is an upper body portion of an aircraft and the bottom side of the vehicle is a lower body portion of an aircraft.

Example 4 includes the system of any of the Examples 1-3, further including a spoofing database configured to store at least operating instructions implemented by the spoofing controller and past signal information received from the at least one primary antenna and at least one secondary antenna.

Example 5 includes the system of any of the Examples 1-4, wherein the spoofing controller further determines if a spoofing signal is present by comparing receiver autonomous integrity monitoring (RAIM) information with expected RAIM information.

Example 6 includes the system of any of the Examples 1-5, wherein the spoofing controller further determines if a spoofing signal is present by comparing a dilution of precision (DOP) determined by the primary satellite signals and the secondary satellite signals.

Example 7 includes the system of any of the Examples 1-6, further including a communication unit in communication with the spoofing controller. The communication unit configured to communicate information relating to a spoofing signal determined by the spoofing controller to a remote location.

Example 8 includes the system of any of the Examples 1-7, further including a vehicle control system configured to control operations of the vehicle. The vehicle control system in communication with the spoofing controller. The vehicle control system configured to control operations of the vehicle based at least in part on communications from the spoofing controller.

Example 9 includes the system of Example 8, wherein the vehicle control system is configured to at least mitigate position computations used to control operations of the vehicle when the spoofing controller determines a spoofing signal is present.

Example 10 includes the system of any of the Examples 1-9, wherein the spoofing controller further determines if a spoofing signal is present by comparing satellite almanac information in the primary satellite signals and the secondary satellite signals.

Example 11 includes a method of detecting a spoofing signal. The method includes receiving primary satellite signals from a primary antenna and secondary satellite signals from at least one secondary antenna, wherein the primary antenna is mounted on a top side of a vehicle than the at least one secondary antenna is mounted on bottom side of the vehicle; and comparing primary information from the primary satellite signals and secondary information from the secondary satellite signals in determining if a spoofing signal is present in one of the primary satellite signals and the secondary satellite signals, wherein the primary information and the secondary information includes a number of satellites used in position computations along with protection limits.

Example 12 includes the method of Example 11, wherein the primary information and secondary information further includes at least one of signal strength and a number of visible satellites.

Example 13 includes the method of any of the Examples 11-12, wherein the primary information and the secondary information further includes receiver autonomous integrity monitoring (RAIM) information.

Example 14 includes the method of any of the Examples 11-13, wherein the primary information and the secondary information further includes dilution of precision (DOP) information.

Example 15 includes the method of any of the Examples 11-14, further including communicating information regarding a determined spoofing signal to a remote location.

Example 16 includes the method of any of the Examples 11-15, further including controlling operations of a vehicle based at least in part on a determined spoofing signal.

Example 17 includes the method of any of the Examples 11-16, further including considering a bank angle of the vehicle when determining primary information and secondary information.

Example 18 includes method of detecting a spoofing signal. The method includes receiving primary satellite signals from a primary antenna and secondary satellite signals from at least one secondary antenna, wherein the primary antenna is mounted on a top side of a vehicle and the at least one secondary antenna is mounted on a bottom side of the vehicle; and comparing primary information from the primary satellite signals and secondary information from the secondary satellite signals in determining if a spoofing signal is present in one of the primary satellite signals and the secondary satellite signals, wherein the primary information and the secondary information includes a number of visible satellites.

Example 19 includes the method of Example 18, wherein the primary information and the secondary information further includes at least one of receiver autonomous integrity monitoring (RAIM) information, dilution of precision (DOP) information, satellite almanac information, number of satellites used in position computations, protection limits associated with the position computations and signal strength.

Example 20 includes the method of any of the Examples 18-19, further including communicating information relating to a determined spoofing signal to a remote location.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A satellite spoofing signal detection system, the system comprising:

at least one primary antenna installed on a top side of a vehicle body;

at least one secondary antenna installed on a bottom side of the vehicle body; and a spoofing controller configured to determine if a spoofing signal is present by comparing primary signals received by the at least one primary antenna and secondary signals received by the at least one secondary antenna, wherein the spoofing controller determines if a spoofing signal is present by comparing a number of signal sources used in position computations along with protection limits and comparing a number of visible signal sources determined by a number of the primary signals from different signal sources received at the primary antenna and a number of the secondary signals from different signal sources received at the at least one secondary antenna.

2. The system of claim 1, wherein the spoofing controller further determines if a spoofing signal is present by comparing a signal strength between the primary signals and the secondary signals.

3. The system of claim 1, wherein the top side of the vehicle is an upper body portion of an aircraft and the bottom side of the vehicle is a lower body portion of an aircraft.

4. The system of claim 1, further comprising:

a spoofing database configured to store at least operating instructions implemented by the spoofing controller and past signal information received from the at least one primary antenna and at least one secondary antenna.

5. The system of claim 1, wherein the spoofing controller further determines if a spoofing signal is present by comparing receiver autonomous integrity monitoring (RAIM) information with expected RAIM information.

6. The system of claim 1, wherein the spoofing controller further determines if a spoofing signal is present by comparing a dilution of precision (DOP) determined by the primary signals and the secondary signals.

7. The system of claim 1, further comprising:

a communication unit in communication with the spoofing controller, the communication unit configured to communicate information relating to a spoofing signal determined by the spoofing controller to a remote location.

8. The system of claim 1, further comprising:

a vehicle control system configured to control operations of the vehicle, the vehicle control system in communication with the spoofing controller, the vehicle control system configured to control operations of the vehicle based at least in part on communications from the spoofing controller.

9. The system of claim 8, wherein the vehicle control system is configured to at least mitigate position computations used to control operations of the vehicle when the spoofing controller determines a spoofing signal is present.

10. The system of claim 1, wherein the spoofing controller further determines if a spoofing signal is present by comparing satellite almanac information in the primary signals and the secondary signals.

11. A method of detecting a spoofing signal, the method comprising:

receiving primary signals from a primary antenna and secondary signals from at least one secondary antenna, wherein the primary antenna is mounted on a top side of a vehicle and the at least one secondary antenna is mounted on a bottom side of the vehicle; and comparing primary information from the primary signals and secondary information from the secondary signals in determining if a spoofing signal is present in one of the primary signals and the secondary signals, wherein the primary information and the secondary information includes a number of signal sources used in position computations along with protection limits and a number of visible signal sources determined by the primary signals received from different sources at the primary antenna and the secondary signals received from different sources at the at least one secondary antenna.

12. The method of claim 11, wherein the primary information and the secondary information further include at least one of signal strength and a number of visible satellites.

13. The method of claim 11, wherein the primary information and the secondary information further includes receiver autonomous integrity monitoring (RAIM) information.

14. The method of claim 11, wherein the primary information and the secondary information further includes dilution of precision (DOP) information.

15. The method of claim 11, further comprising:

communicating information regarding a determined spoofing signal to a remote location.

16. The method of claim 11, further comprising:

controlling operations of a vehicle based at least in part on a determined spoofing signal.

17. The method of claim 11, wherein the primary information and the secondary information further includes satellite almanac information.

18. A method of detecting a spoofing signal, the method comprising:

receiving primary signals from a primary antenna and secondary signals from at least one secondary antenna, wherein the primary antenna is mounted on a top side of a vehicle and the at least one secondary antenna is mounted on a bottom side of the vehicle; and comparing primary information from the primary signals and secondary information from the secondary signals in determining if a spoofing signal is present in one of the primary signals and the secondary signals, wherein the primary information and the secondary information includes a number of visible signal sources at the primary antenna and the at least one secondary antenna.

19. The method of claim 18, wherein the primary information and the secondary information further includes at least one of receiver autonomous integrity monitoring (RAIM) information, dilution of precision (DOP) information, satellite almanac information, number of satellites used in position computations, protection limits associated with the position computations and signal strength.

20. The method of claim 18, further comprising:

communicating information relating to a determined spoofing signal to a remote location.

* * * * *